Nov. 20, 1951 H. H. BOGIN 2,575,789
PROCESS AND APPARATUS FOR MANUFACTURING CAPSULES
Filed Nov. 15, 1948 4 Sheets-Sheet 1
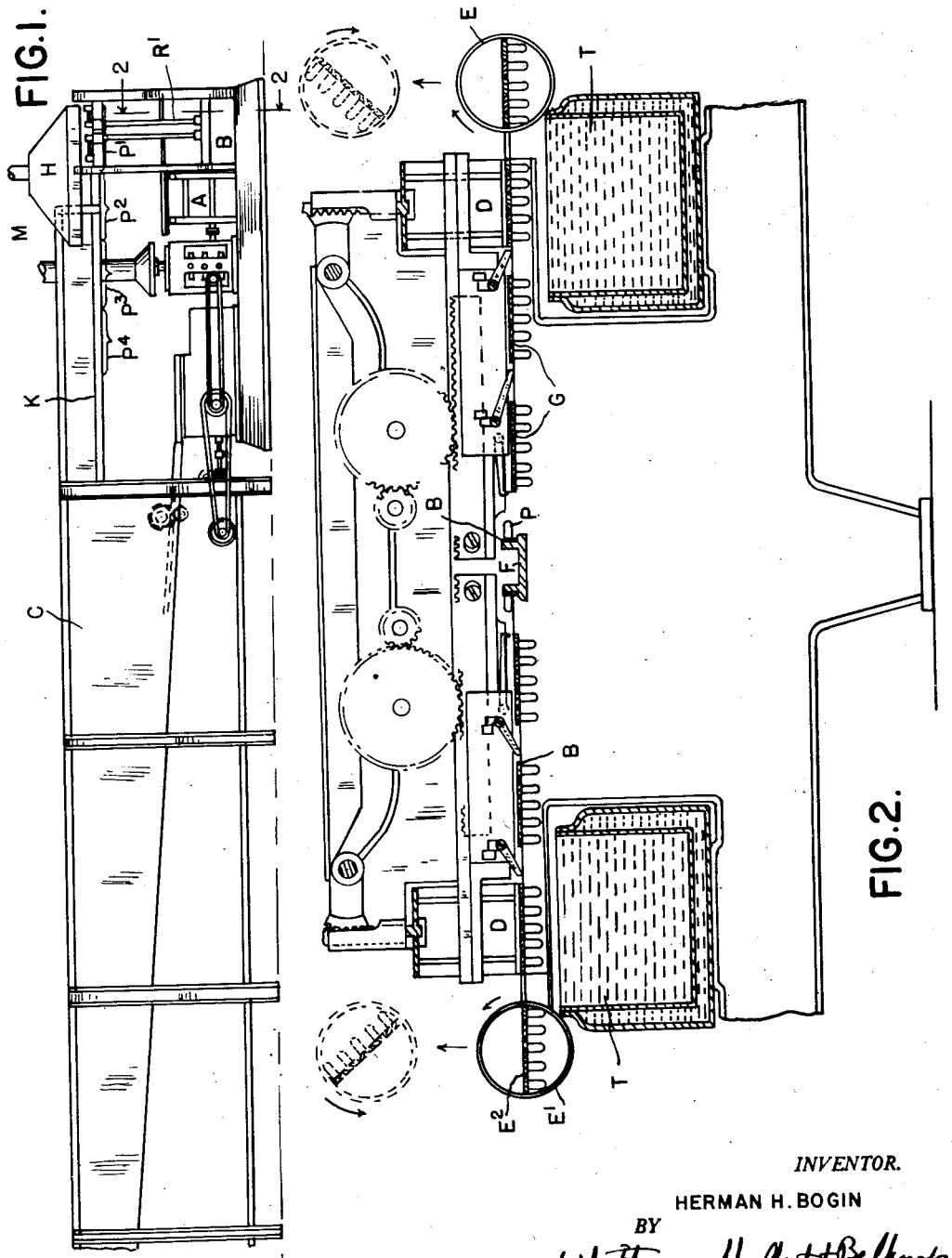
INVENTOR.
HERMAN H. BOGIN
BY
*Whittemore Hulbert & Belknap*
ATTORNEYS

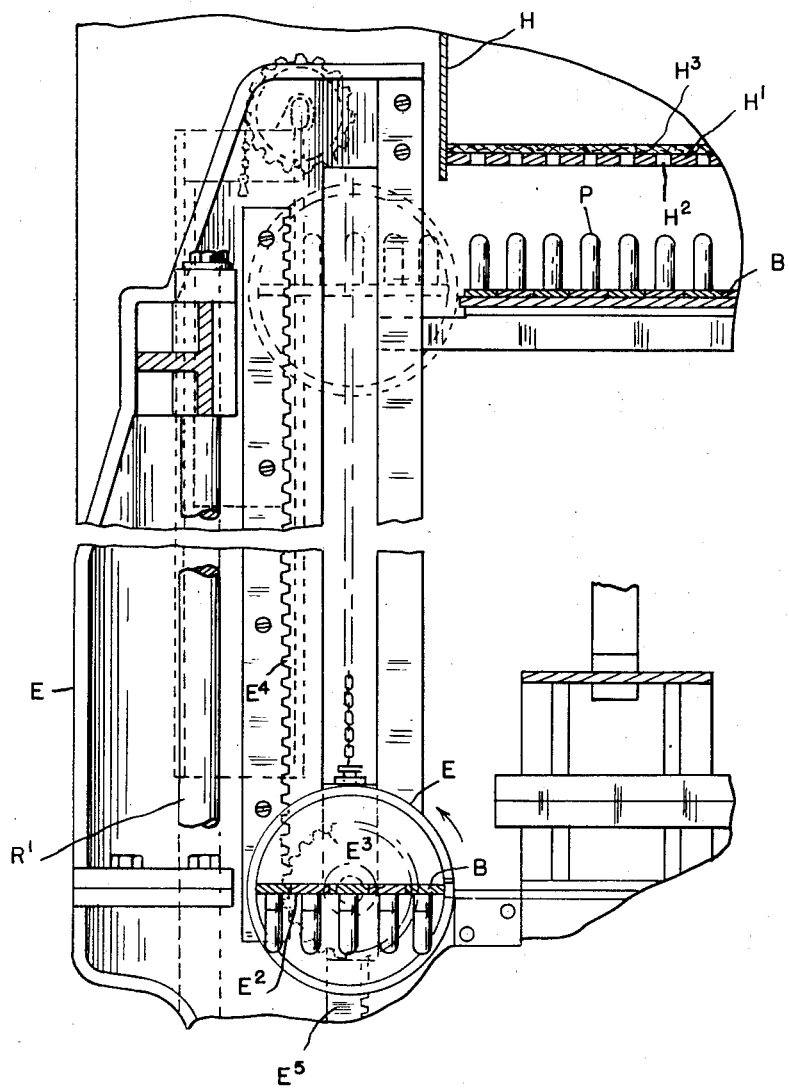

Nov. 20, 1951 H. H. BOGIN 2,575,789
PROCESS AND APPARATUS FOR MANUFACTURING CAPSULES
Filed Nov. 15, 1948 4 Sheets-Sheet 3

INVENTOR.
HERMAN H. BOGIN
BY
Whittemore Hulbert & Belknap
ATTORNEYS

Nov. 20, 1951     H. H. BOGIN     2,575,789
PROCESS AND APPARATUS FOR MANUFACTURING CAPSULES
Filed Nov. 15, 1948     4 Sheets-Sheet 4

INVENTOR.
HERMAN H. BOGIN
BY
Whittemore, Hulbert & Belknap
ATTORNEYS

Patented Nov. 20, 1951

2,575,789

UNITED STATES PATENT OFFICE 2,575,789

PROCESS AND APPARATUS FOR MANUFACTURING CAPSULES

Herman H. Bogin, Detroit, Mich., assignor to Parke, Davis & Company, Detroit, Mich., a corporation of Michigan Application November 15, 1948, Serial No. 60,006

7 Claims. (Cl. 18—25)

The invention relates to the manufacture of hard-sheel enteric capsules.

This application is a continuation-in-part of my application Serial No. 657,073, filed March 25, 1946 now Patent No. 2,491,475 issued December 20, 1949 in which I have claimed capsules composed of a novel enteric composition. The present application is more particularly directed to the method and apparatus for manufacturing such enteric capsules.

As has been pointed out in application Serial No. 657,073, it is desirable to manufacture my new enteric capsules on automatic machines such as have long been in use for the making of non-enteric hard-shell capsules of ordinary gelatin. An automatic capsule making machine which is commercially used on a large scale is the one described in Colton Patent No. 1,787,777, issued January 6, 1931. However, the enteric capsules of my invention cannot be satisfactorily produced on such a machine without reorganization thereof to compensate for the inherently different properties of the enteric composition from those of ordinary gelatin.

The present invention is directed to a new method and an improved apparatus for manufacturing the capsules of my invention and it is of particular utility because it permits the use of the machine as described in said Colton patent with only a minimum amount of alteration and reorganization.

In the present state of the art, hard-shell gelatin capsules are made by immersing previously lubricated pins in a gelatin solution heated to above room temperature. When the pins with the gelatin coating thereon are removed, this coating is preliminarily set to an extent to prevent the running of the gelatin by slowly rotating the pins while at the same time lifting them to an elevated platform. During this movement through the surrounding air at room temperature, the gelatin sets sufficiently so that the pins with the gelatin coating at the upper ends may remain relatively stationary without unduly changing the wall thickness of the gelatin. The pins with the substantially set gelatin coatings are then fed through a drying unit where the moisture is gradually removed with dehumidified air at a temperautre slightly above room temperature.

The enteric capsules of my invention are of a composition which does not become set by the preliminary drying procedure above described, and it is not possible to manufacture satisfactory enteric capsules in the conventional automatic machine by merely substituting the new composition.

However, I have invented a method for overcoming this difficulty by providing supplementary means for setting the composition before the coated pins reach the drying unit. The preferred method which I employ is to utilize a current of air at a temperature lower than room temperature and direct the cool air current on the coated pins in the interval between the withdrawal of the dipped pins and the feeding of them into the drying unit. I have found that excellent results are obtained if the cool air current is directed into contact with the composition as soon as the coated pins have finished their upward rotating motion as above described. The temperature of the cooling air (less than about 65° F.) and the time the composition is exposed thereto are such as to insure that the composition is set before it may run sufficiently to alter the uniformity of the capsule walls.

The cooling feature of the process is a very critical step because the enteric material adhering to the pins does not set as rapidly as ordinary gelatin but tends to run and produce a capsule with uneven walls. I have found that this cooling may be conveniently and rapidly accomplished by blowing cool air across the coated pins but it should be understood that while this is the preferred method of cooling, the invention is not limited to this particular method.

In order to more fully describe my invention, reference should be made to the accompanying drawings, wherein:

Figure 1 is a diagrammatic side elevation of a portion of the ordinary capsule-making machine of Patent No. 1,787,777 with the cooling apparatus added thereto;

Figure 2 is a transverse vertical section on the line 2—2 of Figures 1 and 4 showing the dipping units;

Figure 3 is a similar transverse vertical section on a large scale showing the mechanism for elevating and whirling the capsule-carrying pins;

Figure 4:
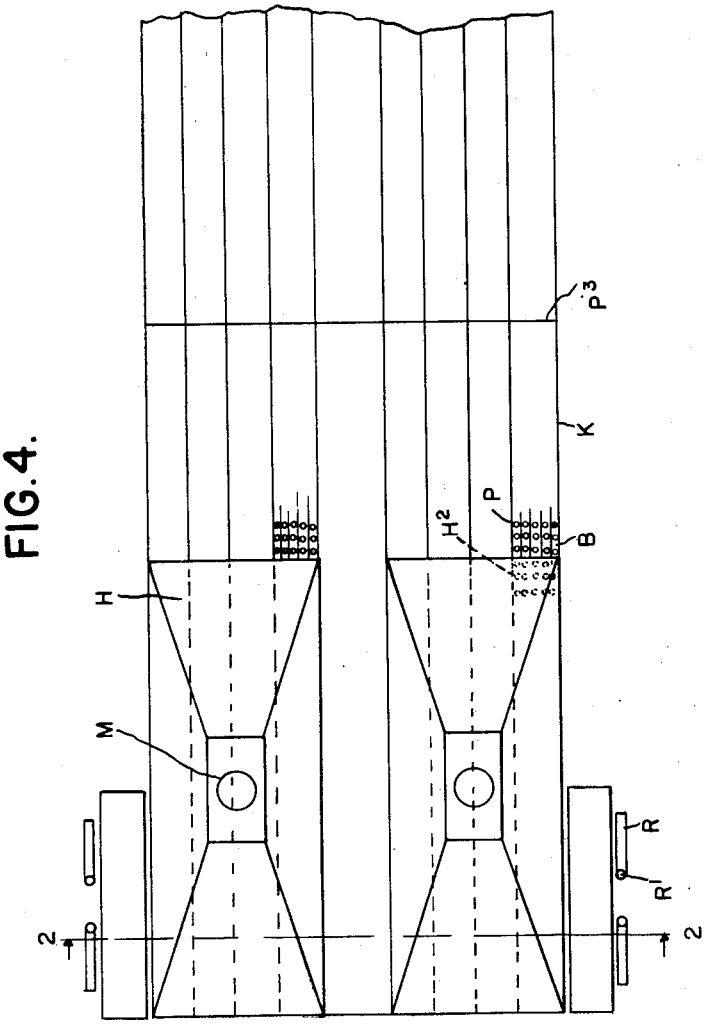
Figure 4 is a top plan view showing the location of the cooling means.
Figure 5:
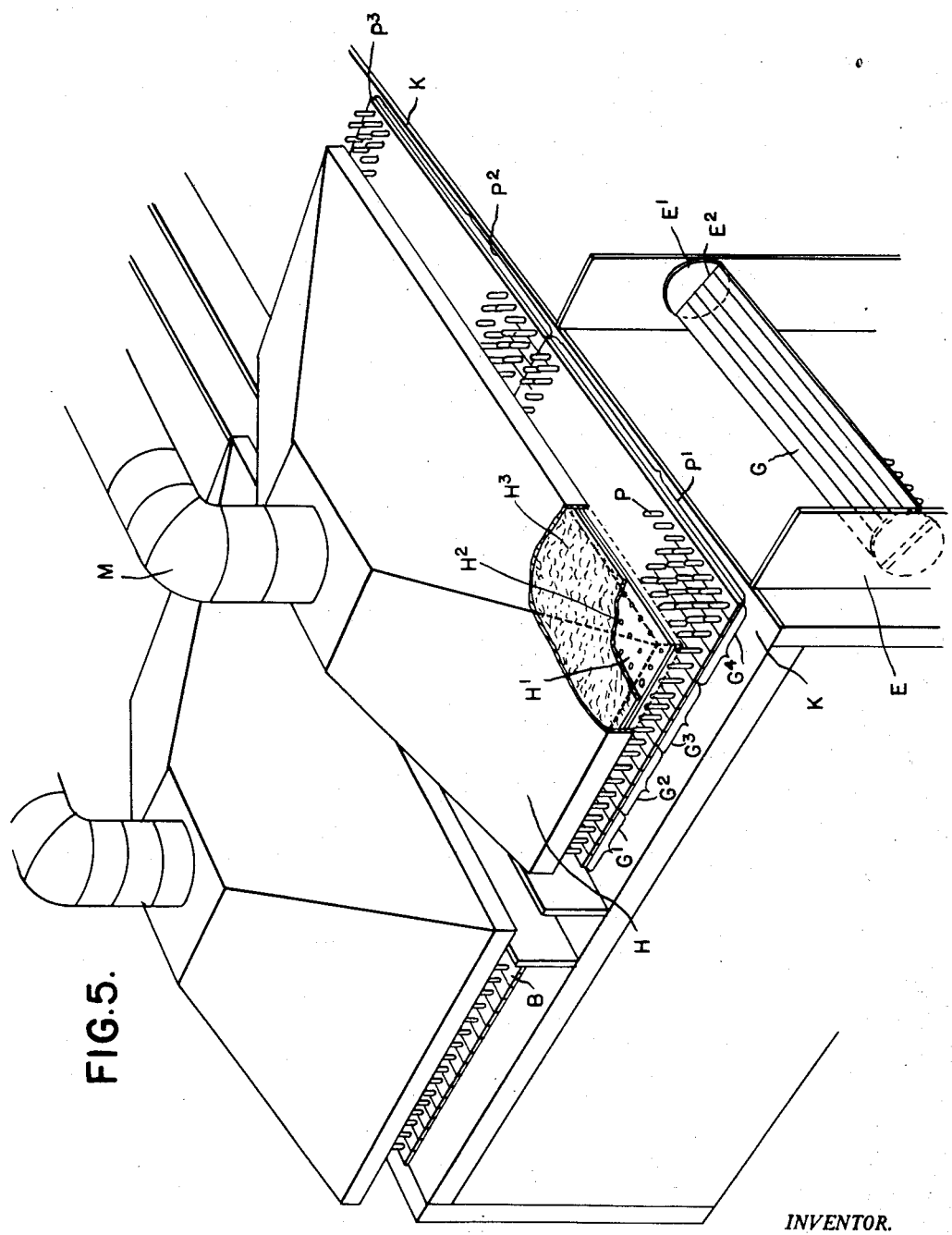
Figure 5 is a perspective view from the side opposite from Figure 1.

Referring now to the drawings, I have specifically illustrated only those portions of the capsule-making machine which are functionally related to the mechanism for carrying out the present invention. The remaining mechanism for the complete auomatic operation of the machine is fully illustrated and described in Colton Patent No. 1,787,777.

In general, this machine operates on the principle of progressively advancing a series of pin-carrying elongated bars B, each having a single row of pins P thereon. There are two sets of the pin bars B, one having pins of a size to form the capsule body and the other of a size to form the capsule cap, and these pin bars are respectively advanced through duplicate apparatus upon opposite sides of the longitudinal center of the machine, as illustrated in Figure 2. After the capsule portions are separately and simultaneously formed in the duplicate apparatus, they are joined together and the complete capsule delivered from the machine. For simplicity, only one of the duplicate mechanisms will be described.

The pins P, upon which the capsules are formed, are first greased in the greasing unit A (Figure 1). The individual bars B move lengthwise in the center of the machine on a carrier F (Figure 2), are collected in groups G of five bars each and moved laterally with the pins hanging downward. Each group is then intermittently advanced, step by step, according to a predetermined timing arrangement until it reaches the dipping unit D where it is positioned above a tank T containing a solution of capsule-forming material at the proper consistency and temperature. The group of bars is then lowered so that the pins dip into the solution and remain there for a short time to collect a coating thereon after which the group is lifted from the solution and moved laterally into an elevating device E. The elevator lifts the group to a higher level and during the elevation also rotates the coated pins through the atmosphere so as to prevent the running of the composition. Upon reaching the upper level, the group of bars is in a horizontal position with the pins P extending upward and each group is moved laterally from the elevator upon the bed K of the drier unit C. The group then remains stationary in this position until the next group of bars arriving from the elevator moves the first group laterally on the bed. This sequence continues until four successive groups $G^1$, $G^2$, $G^3$ and $G^4$ are arranged side by side on the bed in the position indicated as $P^1$. Thereupon the four groups of five bars each are moved together to the second position $P^2$ on the bed K, and this intermittent movement continues step by step through consecutive positions $P^3$, etc. throughout this entire drier unit C. From this point on, the machine need not be described herein but, as disclosed in Patent No. 1,787,777, the bars B after reaching the far end of the machine are lowered to the original level, and pass back through the drier to reach eventually the automatic stripping, cutting and capping unit. After the capsule parts have been stripped from the pins, the bars B are moved out of the stripping unit to the greasing unit A preparatory to a repetition of the operating cycle.

The mechanism for operating the various units is fully described in Patent No. 1,787,777 and need not be repeated here. However, the intermittent advancement of the groups G of pin-carrying bars to the dipping tank T is shown in Figure 2 and the same figure illustrates the mechanism for lowering the groups into the dipping tank, withdrawing the coated pins and moving them laterally into the elevator E. Figure 3 illustrates the elevating movement of the group of bars in the two rotary heads $E^1$ which are diametrically grooved at $E^2$ to receive the opposite ends of the bars B. Each rotary head has a gear $E^3$ meshing with a stationary vertical rack $E^4$ so that as the rotary head is moved upward by the elevating rack slide $E^5$, the group of bars is turned over and over until its upper limit of travel is reached. These elements are so proportioned that when the elevator reaches its upper limit of travel, the bars will be turned with the pins up and in position to be moved laterally out of the grooves $E^2$ onto the bed or table K by means of the rocker arms R on the vertical shafts $R^1$.

In accordance with my invention, the machine as above described is provided with supplementary cooling means and, as specifically shown, this comprises a hood H arranged above the table K in such a position that the group of bars G delivered from the elevator passes immediately beneath the same before the coated pins have been allowed to remain stationary for any appreciable length of time. Cool air is supplied to the hood through a pipe M and is directed by the hood into contact with the coating on the pins. The hood H is preferably of a width to embrace the four adjacent groups of bars $G^1$, $G^2$, $G^3$ and $G^4$ and is of a length to cover not only the length of the bars in the first position $P^1$ on the bed or table K but also to extend completely over the four groups of bars in the second position $P^2$.

In order that the cooling air may be effectively utilized for the setting of the coating without unduly cooling other parts of the automatic machine, it is desirable to provide means for producing individual streams of air directed into contact with each of the coated pins. One way for accomplishing this result is to provide the hood H with a bottom plate $H^1$ having a series of apertures $H^2$ arranged in axial alignment with each of the coated pins beneath the hood. If desired, a pervious sheet $H^3$ may be placed over the bottom plate to serve as a filter and air cleaner.

It is preferable to operate the automatic machine in a room where the atmosphere is maintained at constant temperature and humidity, such as 74–5° F. temperature and 43–47% humidity. The temperature of the cooling air within the hood H should be below 65° F., for example 55° F. The time of exposure of the coated pins to the cooling air must be sufficient to complete the setting of the coating material so that there will be no substantial change in form during the remainder of the process, including the drying step, where the temperatures are raised somewhat above the room temperature.

In general, I have found it preferable to maintain the cooling air in contact with the coated pins for not substantially less time than sixty seconds but a longer period is not harmful. Thus, with the machine as hereinbefore described the timing of the machine may be such as to deposit one group of five bars of pins every fifteen seconds on the table K. Since four of said groups are successively moved laterally under the hood in position $P^1$ before the four units are moved longitudinally into position $P^2$ under the rear position of the hood, the first group of bars $G^1$ is subjected to the cooling air for a longer total time than the fourth group $G^4$. As an illustration of one satisfactory time schedule, the first group to reach the hood has a total exposure of two minutes while the last group has an exposure to the cooling air of about seventy-two seconds, These times are not necessarily critical but are illustrative.

The subsequent drying operation in the presence of dehumidified air usually takes place on a successively increasing temperature scale starting at about 76° F. The total drying time before the capsule shells are stripped from the pins and the excess removed by cutting it about forty to forty-five minutes.

The enteric capsules of my invention may be prepared from a solution of a material possessing setting properties, such as gelatin, and a water soluble, alkali metal salt of a partial ester of a polycarboxylic acid and a suitable cellulose ester. The partial ester of a polycarboxylic acid and a cellulose carboxylate derivatives containing free carboxyl groups is dissolved in an aqueous solution of an alkali metal base to obtain an aqueous solution of the corresponding alkali metal salt of the cellulose ester. Some examples of the alkaline reagents which I may use for this purpose are sodium bicarbonate, sodium carbonate, potassium carbonate, sodium hydroxide, trisodium phosphate, sodium perborate, potassium hydroxide, lithium hydroxide and lithium carbonate. In making these aqueous solutions containing the salts of the cellulosic esters, I prefer to use just enough alkali to effect the solution of the ester, as any excess alkali present in the final solution tends to destroy or alter the gelatin. However, if desired, an excess of alkali may be used and the excess alkali present in the resultant solution neutralized with acid before adding the gelatin; or, the solution may be heated until the pH falls to the proper value. The pH of the solution should preferably be on the acid side and about the same as that of the gelatin itself. The proper amount of alkali to use may be readily determined by a simple test on a small sample or it may be calculated if one knows the percentage of free carboxyl groups present in the cellulosic partial ester.

I next add the aqueous gelatin solution to the aqueous solution containing the alkali metal salt of the partial ester of a polycarboxylic acid and a cellulose carboxylate derivative. The mixture is then heated until a homogeneous viscous aqueous solution is obtained.

In carrying out my invention I use polycarboxylic acid partial esters of cellulose esters of lower aliphatic monocarboxylic acids. These cellulosic derivatives which contain free carboxyl groups may be made by known methods of preparation, such as those disclosed in United States Patents Nos. 2,093,462 and 2,093,464 and also 2,126,460. For example, cellulose or cellulosic derivatives containing free hydroxyl groups can be reacted with a polycarboxylic acid acylating agent, such as an anhydride of the polycarboxylic acid, in the presence of a base, or in the presence of a solvent and in the absence of an organic base. These partial esters of the various cellulosic derivatives may be simple esters of polycarboxylic acids or they may be mixed esters wherein more than one kind of polycarboxylic acid group is present. I may use the reaction products of polycarboxylic acid anhydrides with cellulose esters containing free hydroxyl groups capable of combining with the same or different acid anhydride of a polycarboxylic acid to form an ester linkage and also increase the number of free carboxylic acid groups present. Such anhydrides are, for example, phthalic, succinic and maleic anhydrides. Examples of cellulose derivatives containing free hydroxyls in the cellulose part of the molecule which may be acylated are cellulose acetate, cellulose propionate, cellulose acetate-propionate, cellulose butyrate, etc.

I prefer to use the mixed cellulose esters of a lower aliphatic monobasic acid and a polybasic acid, such as phthalic acid, with at least one free unesterified carboxylic acid group present in the polybasic acid portions of the molecule, e. g. cellulose-acetate-phthalate, cellulose-propionate-phthalate and the like. Free carboxyl groups need not be present in molecular portions to the polycarboxylic acid portion of the molecule but the ester may have any free carboxyl content of between about 8 and 15% by weight has been found preferable in the preparation of my new enteric capsules, as capsules prepared from such cellulose derivatives disintegrate rapidly on contact with the alkaline secretions of the intestines and also possess better physical properties such as resilience, etc.

As stated above, I combine an aqueous solution of an alkali metal salt of a cellulose derivative, such as cellulose-acetate-phthalate, with gelatin and use the resultant homogeneous aqueous solution in the preparation of my new enteric capsules. This homogeneous solution containing the essential ingredients of my new capsules must be an aqueous solution. This is due to the fact that gelatin is insoluble in organic solvents such as alcohol, acetone, ether and like solvents which readily dissolve the free carboxylic acid cellulose ester derivatives which I use as starting materials. Conversely, these free carboxylic acid cellulose ester derivatives are not soluble in water whereas gelatin is. Thus it is readily apparent that without first converting these cellulosic esters to a water-soluble salt it is impossible to obtain a homogeneous mixture of the two components which is suitable for use in making enteric capsules.

I have found that the gelatin-cellulosic material weight ratio is a critical factor in the preparation of my new enteric capsules. This arises from the fact that a sufficient quantity of a salt of the cellulose derivative must be present in the finished capsule to render it insoluble in the stomach acids but the quantity must not be so great as to prevent the rapid solution of the capsule when it comes in contact with the alkaline secretions of the intestine. The amount of the cellulosic salt present in the final capsule is also limited by the fact that if too much is present the capsule is brittle. Moreover, difficulties are encountered during the manufacture of such capsules whenever sufficient gelatin is not present to set the material on the pin or mold and thus prevent the material from running. I have found that the best results are obtained by starting with about 4 to 9 parts by weight of gelatin to 1 part by weight of the un-neutralized cellulose derivative. In the case of cellulose-acetate-phthalate I find that particularly valuable enteric capsules are obtained by starting with about 5.6 parts by weight of gelatin and 1 part by weight of cellulose-acetate-phthalate. Of course, the optimum proportions will vary somewhat with the individual cellulose derivatives used and with the molecular weight of the same as well as with the grade or type of gelatin used. However, these proportions may be readily ascertained by simple experiment.

It should be understood that, strictly speaking, the expression "parts by weight" can only be properly applied to the parts by weight of the individual starting materials in the form in which they are customarily obtained as articles of commerce, due to the lack of an analytical method for determining the amounts of the various materials present in the finished capsule. However, since the gain in weight of the cellulosic material due to neutralization is small, the parts by weight of the salt of the cellulosic material present in the finished capsule may be considered to be the same as the parts by weight of the un-neutralized cellulosic material used as the starting material.

The amount of water which I use in the preparation of the aqueous solution containing the gelatin and the salt of the cellulose derivative depends to a great extent on the wall thickness desired in the finished capsule. For instance, if a thin-walled capsule is desired, more water is used in the preparation of the solution, whereas if a thick-walled capsule is desired a more concentrated or viscous solution is used. For example, I have found when starting with 5.6 parts by weight of gelatin and 1 part by weight of cellulose-acetate-phthalate that the aqueous solution should have a viscosity of between about 150 to 300 seconds Stormer at 120° F. in order to produce capsules having a wall thickness of about 0.004 inch. While the amount of water necessary to produce a solution of the desired viscosity for making a capsule of a previously determined wall thickness will vary slightly with the cellulose derivative and the gelatin used, it may be readily determined by a simple experiment. Such an experiment may be carried out by making up a very viscous solution from known amounts of materials and then adding measured amounts of water to the solution until the desired viscosity is obtained.

The wall thickness of the capsule is also dependent upon the temperature of the aqueous solution of gelatin and salt of the cellulose derivative. This factor, however, is maintained fairly constant since an appreciable change in temperature is necessary in order to produce a small change in wall thickness and it is undesirable from a practical standpoint to vary the temperature over large ranges. Therefore, when producing my new capsules on automatic machines such as that described in U. S. Patent No. 1,787,777, the gelatin-cellulose salt solution in the dipping pans is kept at a fairly constant temperature between about 95 and 120° F. and preferably in the neighborhood of about 110° F.

While the hard-shell capsules of my invention are usually composed solely of an alkali metal salt of a cellulose derivative, gelatin and, if desired, a coloring agent, it is permissible to incorporate a plasticizer also, provided that the amount is not large enough to change the essential requirements of hardness and rigidity necessary for a practical hard-shell capsule. Thus up to 5% (by weight of the dry gelatin) of a plasticizer, such as glycerine or propylene glycol may be added, if desired, and the enteric properties produced by the incorporation of the cellulose derivative are still retained when the composition contains this small proportion of plasticizer.

An example of the manufacture of hard-shell enteric capsules by my invention is as follows.

A finely divided mixture consisting of 0.96 lb. of sodium carbonate monohydrate and 6 lbs. of cellulose acetate phthalate (—COOH content=10.7%) is added with stirring to 36 lbs. of water at 180° F. In order to reduce frothing of the mixture, a small amount of glycerol oleate (1.2 fluid oz.) may be added. After solution is complete, the mixture is allowed to cool and stand overnight. The pH of this solution is 5.9±0.1.

In a separate container 35 lbs. of ossein gelatin (Bloom 250 gms.) is soaked in water until the mass weighs 85 lbs. The gelatin is removed, melted at 140° F. and added with rapid stirring to the sodium salt of cellulose-acetate-phthalate solution. (If a colored capsule is desired about 3½ oz. of dye are stirred into the solution at this point.) The resultant solution is heated at 120° F. for four to twelve hours to insure homogeneity of the solution. After a homogeneous solution is obtained, the solution is placed in a dipping pan and maintained at a temperature of 115° F. while previously lubricated pins or molds are dipped into the solution. The pins are withdrawn and cool air (60° F.) blown on the material adhering to the pins to set it. The capsule halves thus formed are dried with dehumidified air, trimmed, removed from the pins and joined together with the other halves of the capsule to form the finished hard-shell capsule.

The capsules obtained in the above manner have a uniform wall thickness of about 0.004 inch. The finished capsules contain about 10% by weight of moisture and are sufficiently resilient to resist cracking even when the opposite walls are pressed together. These capsules do not become appreciably more brittle even when heated for hours at 90° F. in an atmosphere having a relative humidity of only 25%. When these new capsules are placed in cold air saturated with water vapor they maintain their shape much better than the gelatin capsules used as control samples.

While the invention has been described above in connection with the manufacture of enteric capsules of certain chemical compositions, it may also be advantageously used for making capsules of other materials which are slower than ordinary gelatin in the time required to set or gel, such, for example, as low grade gelatin (i. e. gelatin having subnormal setting time), cellulose acetate phthalate, polyvinyl alcohol, cellulose acetate, ethyl cellulose and many others.

Again, while I have shown the cooling air applied to the capsule material after the elevating and rotating step, my invention contemplates more broadly the step of post-dip cooling in the interval prior to the usual drying procedure.

An important feature is that it requires no change in either structure or operation of standard machines used in the manufacture of pure gelatin capsules other than the introduction of the post-dip cooling means to adapt said machines to the manufacture of capsules of other chemical compositions.

What I claim as my invention is:

1. Process for the manufacture of a hard-shell enteric capsule which comprises mixing an aqueous solution of gelatin and an aqueous solution of an alkali metal salt of a polycarboxylic acid partial ester of a cellulose ester of a lower aliphatic monocarboxylic acid to obtain a viscous homogeneous aqueous solution, forming a portion of said viscous solution by means of a mold into the shape of one-half a capsule at a temperature of over about 100° F., cooling the material at a temperature of less than 65° F., drying the capsule half with dehumidified air and joining said capsule half with another similar capsule half having a diameter such that the two units telescope into one another.

2. Process for the manufacture of a hard-shell enteric capsule which comprises mixing an aqueous solution of gelatin and an aqueous solution of an alkali metal salt of cellulose acetate phthalate to obtain a viscous homogeneous aqueous solution, forming a portion of said viscous solution by means of a mold into the shape of one-half a capsule at a temperature of over about 100° F., cooling the material at a temperature of less than 65° F., drying the capsule half with dehumidified air and joining said capsule half with another similar capsule half having a diameter such that the two units telescope into one another.

3. An apparatus for automatically manufacturing capsules, comprising a receptacle for a solution of capsule forming material, means for heating said solution to a predetermined temperature, a multiple pin mold, means for dipping and withdrawing the pins of said mold into and out of the heated solution in said receptacle to coat said pins, means for drying the coating on said pins after the setting of the same, and means for supercooling the coating on said pins in the interval between said withdrawal and said drying to effect the setting of the capsule material.

4. An apparatus for automatically manufacturing capsules, comprising a receptacle for a solution of capsule forming material, means for heating said solution to a predetermined temperature, a multiple pin mold, means for dipping and withdrawing the pins of said mold into and out of the heated solution in said receptacle to coat said pins, means for repeatedly inverting said pin molds when withdrawn from the solution, means for drying the coating on said pins after the setting of the same, and means for blowing cooling air over the coating on said pins in the interval between said withdrawal and said drying to effect the setting of the same in a diminished time interval.

5. A capsule making machine comprising a receptacle for the capsule forming material, means for heating said material to a predetermined temperature, a holder for a group of pins, means for dipping said group of pins into said heated material, means for withdrawing said group of pins from said heated material with a coating adhering thereto, an elevated platform, an elevator adapted to rotate said group of pins while lifting the same, means for moving said group of pins laterally from said elevator onto said platform, means for intermittently longitudinally advancing said group of pins on said platform to a drier, and means for blowing cooling air over said coated pins while on said platform and prior to said longitudinal advancement.

6. A capsule making machine comprising a receptacle for the capsule forming material, means for heating said material to a predetermined temperature, a holder for a group of pins, means for dipping said group of pins into said heated material, means for withdrawing said group of pins from said heated material with a coating adhering thereto, an elevator adapted to rotate said group of pins while transferring the same to an elevated platform, means for intermittently advancing said group of pins on said platform to a drier, a hood over said platform extending to a point adjacent said elevator, and means for blowing air through said hood over said coated pins.

7. In a capsule making machine, the combination with a mechanism for coating pins with a capsule material and means for transferring the coated pins to a drier, of a capsule setting device comprising means between said dipping mechanism and said drier for blowing air at a temperature about 55° F. over said coated pins.

HERMAN H. BOGIN.

REFERENCES CITED

The following references are of record in the file of this patent:

UNITED STATES PATENTS

| Number | Name | Date |
|---|---|---|
| 1,787,777 | Colton | Jan. 6, 1931 |
| 1,978,829 | Wilkie | Oct. 30, 1934 |